(12) United States Patent
Usami (10) Patent No.: US 12,076,936 B2
(45) Date of Patent: Sep. 3, 2024

(54) APPARATUS AND METHOD FOR MANUFACTURING A SURFACE-LAYERED PART

(71) Applicant: TOYODA IRON WORKS CO., LTD., Toyota (JP)

(72) Inventor: Toru Usami, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 448 days.

(21) Appl. No.: 17/440,519

(22) PCT Filed: Sep. 17, 2020

(86) PCT No.: PCT/JP2020/035216
§ 371 (c)(1),
(2) Date: Sep. 17, 2021

(87) PCT Pub. No.: WO2021/140708
PCT Pub. Date: Jul. 15, 2021

(65) Prior Publication Data
US 2022/0161506 A1 May 26, 2022

(30) Foreign Application Priority Data

Jan. 7, 2020 (JP) ................................. 2020-000924

(51) Int. Cl.
*B29C 65/56* (2006.01)
*B60N 2/75* (2018.01)

(52) U.S. Cl.
CPC .............. *B29C 65/565* (2013.01); *B60N 2/75* (2018.02)

(58) Field of Classification Search
CPC ............................. B29C 65/565; B29C 65/56
See application file for complete search history.

(56) References Cited

U.S. PATENT DOCUMENTS 9,254,770 B2 * 2/2016 Nuyan ..................... B32B 37/30
2010/0264698 A1 * 10/2010 Stachura ............. B29C 44/1238
264/46.5

FOREIGN PATENT DOCUMENTS

DE 4308925 A1 2/1995
JP H04-329117 A 11/1992
(Continued)

OTHER PUBLICATIONS

Machine translation JPH0857955A (Year: 1996).*
(Continued)

*Primary Examiner* — Jacob T Minskey
*Assistant Examiner* — Ayne K. Swier
(74) *Attorney, Agent, or Firm* — Oliff PLC (57) ABSTRACT

A manufacturing apparatus may be used for manufacturing a surface-layered part. The surface-layered part includes a base member assembled with a surface layer member, wherein a front side of the flat base member is covered with the surface layer member, and a wrapping portion formed at an edge of the surface layer member is fitted onto the edge of the base member. The apparatus includes a workpiece supporting table on which the base member and the surface layer member are placed, such that the surface layer member is layered on the base member. The apparatus further includes a push-to-fit device for pushing the wrapping portion formed at the edge of the surface layer member in a direction to fit the wrapping portion onto the edge of the base member from an opened position, in which the wrapping portion is positioned away from the edge of the base member.

10 Claims, 5 Drawing Sheets

(56) References Cited

FOREIGN PATENT DOCUMENTS

| JP | H08-057955 A | 3/1996 |
| JP | H11-020016 A | 1/1999 |
| JP | 2004-217080 A | 8/2004 |
| JP | 2007015306 A | 1/2007 |
| JP | 2010-014204 A | 1/2010 |
| JP | 2013124073 A | 6/2013 |
| JP | 2016-175600 A | 10/2016 |

OTHER PUBLICATIONS

Machine translation JP2004217080A (Year: 2004).*
Aug. 15, 2022 Office Action issued in Chinese Patent Application No. 202080003495.7.
Jul. 12, 2022 International Preliminary Report on Patentability issued in International Patent Application No. PCT/JP2020/035216.
Nov. 18, 2022 Extended European Search Report issued in European Patent Application No. 20912579.8.
Oct. 20, 2020 Office Action issued in Japanese Patent Application No. 2020-000924.
Jan. 12, 2021 Office Action issued in Japanese Patent Application No. 2020-000924.
Nov. 2, 2020 International Search Report issued in International Patent Application No. PCT/JP2020/035216.

* cited by examiner

APPARATUS AND METHOD FOR MANUFACTURING A SURFACE-LAYERED PART

CROSS-REFERENCE TO RELATED APPLICATIONS

The present application is a U.S. National Phase entry of, and claims priority to, PCT Application No. PCT/JP2020/035216, filed Sep. 17, 2020, which claims priority to Japanese Patent Application No. 2020-000924, filed Jan. 7, 2020, both of which are incorporated herein by reference in their entireties for all purposes.

BACKGROUND

The present disclosure relates to an apparatus and method for manufacturing a surface-layered part, in particular to an apparatus for manufacturing a surface-layered part that includes a base member assembled with a surface layer member. The present disclosure also relates to a method for manufacturing the surface-layered part using the apparatus, wherein a front side of the flat base member is covered with the surface layer member, and a wrapping portion formed at an edge of the surface layer member is fitted onto the edge of the base member.

Surface-layered parts include, for example, an interior part of an automobile or other vehicle. Such an interior part of an automobile or other vehicle may be formed by covering the front side of a flat base member with a surface layer member (see, for example, Japanese Patent Application Publication No. 2004-217080). Interior parts of an automobile or other vehicle include an armrest installed inside the automobile. The cross-sectional shape of the flat base member of an armrest is convex on the side that faces the surface layer member. The base member is typically a rigid structure made of polypropylene (PP). The surface layer member is arranged on the front side of the base member, so as to conform to the surface of the base member. The surface layer member is typically made of a stretchable olefin-based elastomer, stretched into such a form so as to cover the front side of the base member.

SUMMARY

The present disclosure, in an aspect, provides an apparatus for manufacturing a surface-layered part, wherein the surface-layered part comprises a base member assembled with a surface layer member. A front side of the flat base member is covered with the surface layer member, and a wrapping portion formed at an edge of the surface layer member is fitted onto the edge of the base member. The apparatus comprises a workpiece supporting table on which the base member and the surface layer member are placed such that the surface layer member is layered with the base member. The apparatus further comprises a push-to-fit device for pushing the wrapping portion formed at the edge of the surface layer member in a direction to fit the wrapping portion onto the edge of the base member. The wrapping portion is pushed from an opened position in which the wrapping portion is away from the edge of the base member.

In some embodiments, the push-to-fit device comprises a pushing portion for pushing the wrapping portion formed at the edge of the surface layer member. The pushing portion comprises a rigid base member and an elastic member on a surface of the rigid base member, the surface being one that faces forward in the pushing direction.

In some embodiments, the elastic member on the surface of the rigid base member extends from the end of the base member.

In some embodiments, the pushing portion of the push-to-fit device is configured to move parallel to a surface of the edge of the base member, the surface onto which the wrapping portion formed in the edge of the surface layer member is to be fitted.

The present disclosure in another aspect provides for a method for manufacturing a surface-layered part using the manufacturing devices described above. The method comprises a first step of placing the base member and the surface layer member on the workpiece supporting table, such that the surface layer member is layered under the base member. At this time, the wrapping portion formed in the edge of the surface layer member is in the open position away from the edge of the base member. The method further comprises a second step of operating the push-to-fit device to fit the wrapping portion formed in the edge of the surface layer member onto the edge of the base member. Thereby, the surface layer member is assembled with the base member.

In some embodiments, the base member includes a claw formed at the edge of the base member, and the surface layer member includes an engagement hole at the wrapping portion formed at the edge of the surface layer member. The engagement hole is engageable with the claw. Fitting the wrapping portion of the surface layer member onto the edge of the base member causes the engagement hole to engage the claw.

DETAILED DESCRIPTION

Figure 9:
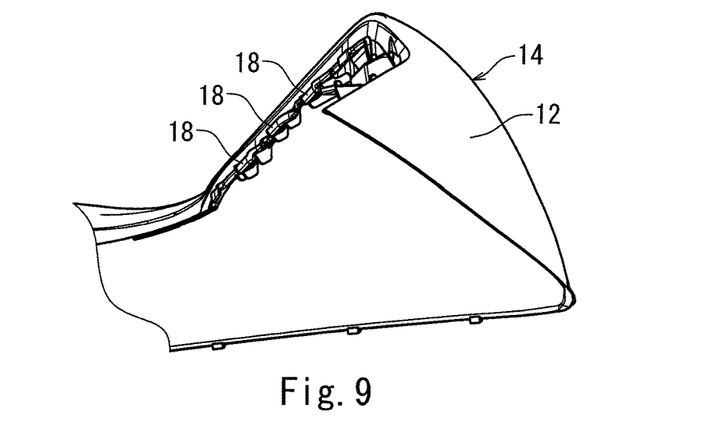
FIG. 9 is an exploded perspective view of the base member and the surface layer member.
Figure 10:
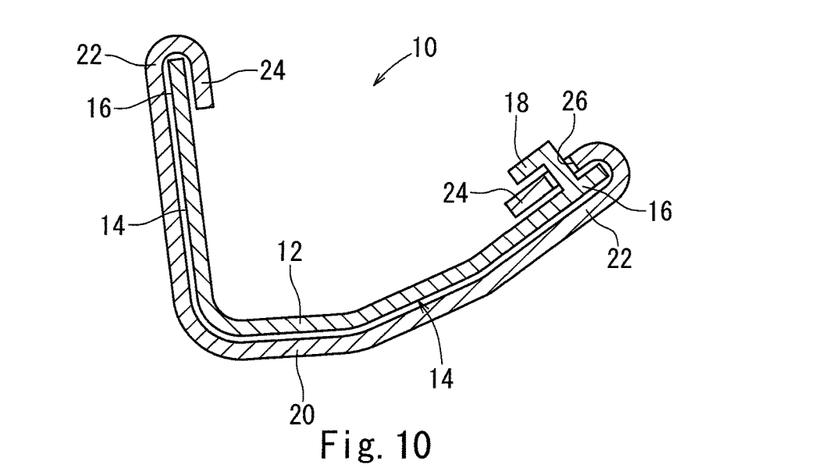
FIG. 10 is a cross-sectional view of a schematic configuration of a base member with a surface layer member attached to the base member.

FIG. 9 is an exploded perspective view of a base member 12 and a surface layer member 20. FIG. 10 shows the base member 12 assembled with the surface layer member 20 covering the base member 12. As shown in FIG. 10, the surface layer member 20 includes wrapping portions 24 at its edge 22. The wrapping portions 24 are configured to wrap the corresponding edges 16 of the base member 12. Assembly of the surface layer member 20 with the base member 12, in a covering manner, is performed by fitting the wrapping portions 24 over the respective edges 16 of the base member 12.

The base member 12 includes one or more claw 18 on one of its edges 16 at locations corresponding to the wrapping portions 24 of the surface layer member 20, as shown on the left side of FIG. 10. Correspondingly, the wrapping portions 24 of the layer surface member 20 each include an engagement hole 26. Each engagement hole 26 in the surface layer member 20 is hooked on the corresponding claw 18. The engagement hole 26 is essentially locked so that the surface layer member 20 is positioned in place, with reference to the base member 12, in a reliable manner.

The work of fitting the wrapping portion 24 of the surface layer member 20 onto the edge 16 of the base member 12 described above is conventionally performed manually by hand.

The above-mentioned manual work of fitting the wrapping portion 24 of the surface layer member 20 onto the edge 16 of the base member 12 relies on the physical power of workers, which requires many man-hours, thereby leading to poor productivity. In addition, the manual work tends to create variations in the quality of a mass-produced product.

In particular, when manually performing the task by hand, hooking the claws 18 into the engagement holes 26 formed in the wrapping portion 24 is a hard work that puts a heavy burden on the workers' hands and fingers. This results in the problem of an increase in the number of man-hours required for the work.

It is desired to improve the productivity in manufacturing surface-layered parts by automating the work of fitting the wrapping portion of the surface layer member onto the edge of the base member.

Embodiments of the present disclosure will be described below with reference to the drawings. In one embodiment, a surface-layered part may be an automobile armrest. An apparatus and a method for manufacturing an armrest will be described below, but a similar apparatus and method may be used to manufacture other surface-layered parts. The up, down, left, right, and other directions used when describing what is shown in the Figures will be based on the directions as seen in those Figures. However, unless otherwise particularly indicated, those directions are non-limiting and are provided for descriptive purposes.

<Armrest>

Firstly, the armrest 10 to be produced by the manufacturing apparatus and method as an embodiment will be described. In one embodiment, the finished shape of the armrest 10 may be substantially the same as that of the armrest shown in FIG. 10, as a conventional armrest. Therefore, the detailed configuration of the armrest 10 will again be described by way of FIGS. 9 and 10.

FIG. 9 is an exploded perspective view of the configuration of one end of an armrest 10. As shown in FIG. 9, the armrest 10 includes a base member 12 and a surface layer member 20. The base member 12 dictates the general form of the armrest 10, and is typically a flat rigid member made of polypropylene (PP). The surface layer member 20 is arranged on the front side 14 of the base member 12, and covers the base member 12. The surface layer member 20 is typically made of an olefin-based elastomer, and has a property of being capable of expanding and contracting to some extent. For the purpose of covering on the base member 12, the surface layer member 20 is formed into a shape complementary to the shape of the base member 12.

(Wrapping Portion)

As shown in FIG. 10, the armrest 10 of the present embodiment has a convex shape on the front side 14 of the base member 12. The surface layer member 20 covers the front side 14 of the convex-shaped base member 12. At least one edge 22 of the surface layer member 20 includes one or more wrapping portion 24, which is configured to wrap a corresponding edge 16 of the base member 12. The wrapping portion(s) 24 are fitted onto the edge(s) 16 of the base member 12. The surface layer member 20 covers the front side 14 of the base member 12 when the wrapping portions 24 at two side edges 22 of the surface layer member 20 are fitted in a wrapping manner over the respective side edges 16 of the base member 12.

(Claws and Engagement Holes)

In the present embodiment, as shown in FIG. 10, the base member 12 includes claws 18 on the edge 16 of the base member 12 in an area corresponding to the wrapping portions 24. FIG. 10 also shows an embodiment where the surface layer member 20 includes engagement holes 26 in these wrapping portions 24. The engagement holes 26 in the wrapping portions 24 are hooked to the respective claws 18, so that the surface layer member 20 is securely attached to the base member 12.

Figure 2:
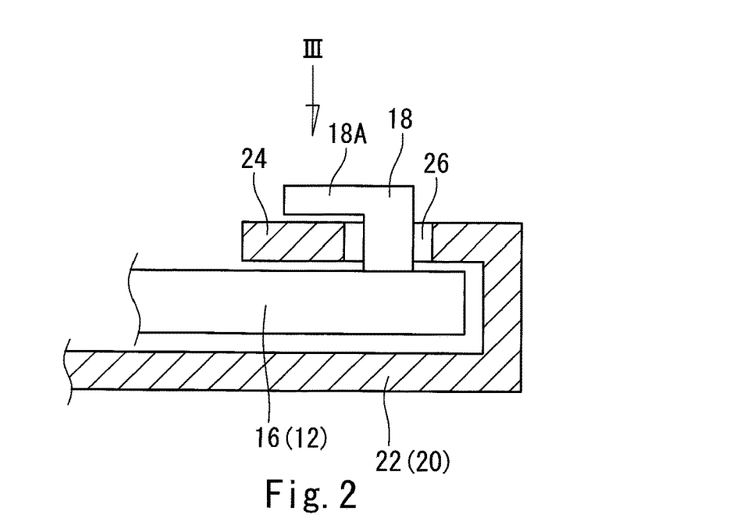
FIG. 2 is an enlarged view of a claw formed at the edge of a base member of FIG. 1. The claw is engaged with an engagement hole formed at a wrapping portion of a surface layer member.
Figure 3:
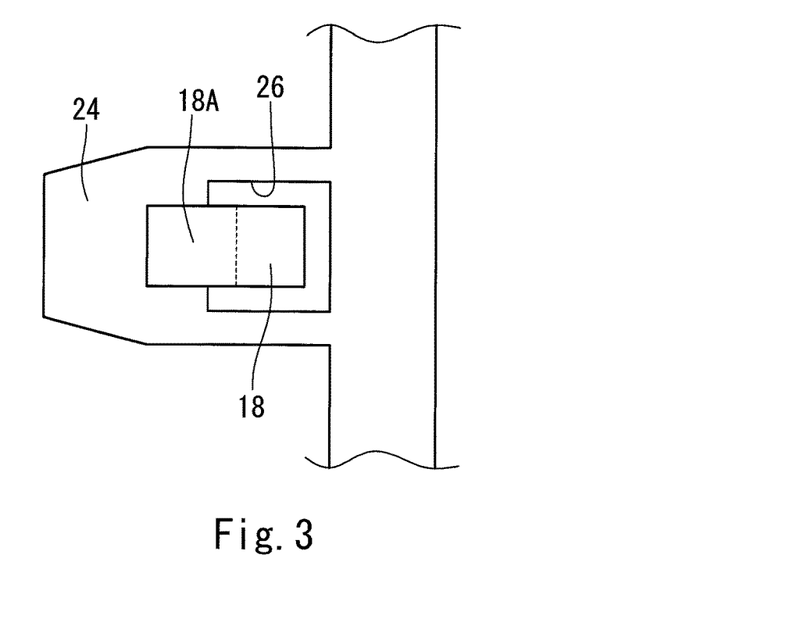
FIG. 3 is a view of the engagement portion of FIG. 2 as viewed in the direction of arrow III of FIG. 2.

FIGS. 2 and 3 show an enlarged view of the engagement between a hooking tab 18A and an engagement hole 26. In the present embodiment, the claw 18 includes a hooking tab 18A extending in the direction in which the wrapping portion 24 is moved when fitted onto the edge 16 of the base member 12. That is, the hooking tab 18A extends right to left as seen in FIG. 3. As a result, the engagement hole 26 of the wrapping portion 24 can only be engaged by the claw 18 once the engagement hole 26 goes beyond the hooking tab 18A. Therefore, the engagement ensures secure fastening of the wrapping portions 24.

Figure 4:
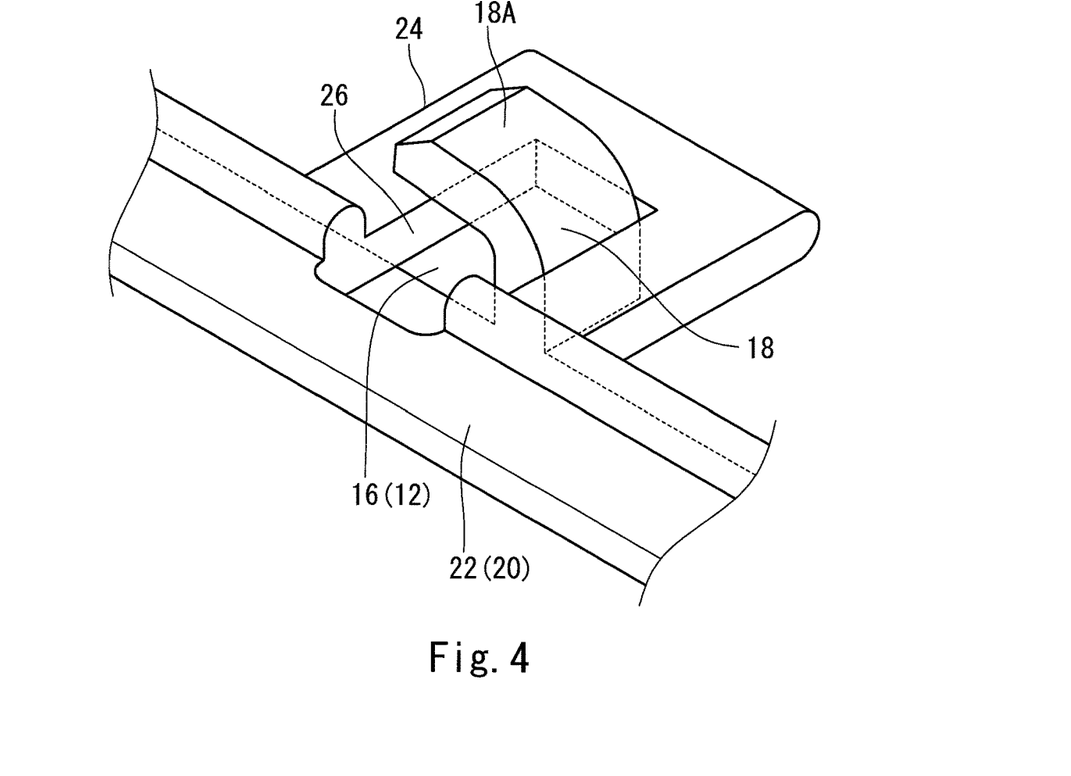
FIG. 4 is a view of an engagement portion according to another embodiment, shown in contrast to FIG. 2.

FIG. 4 shows a modified arrangement of the hooking tab 18A of the claw 18. In this modification, the direction of the hooking tab 18A is perpendicular to the direction of fitting the wrapping portion 24. This configuration may be adopted in certain situations, such as the case where the wrapping portion 24 cannot be moved beyond the position shown in FIG. 4 when being fitted. This allows the wrapping portion 24 to be fitted by being laterally shifted (left to right as seen in FIG. 4), even when the fitting movement of the wrapping portion 24 is limited.

The wrapping portion 24 of the edge 22 of the surface layer member 20 has a smaller width overlapping the edge 16 of the base member 12 in the portion where the claws 18 are located than in the portions of the edge 22 of the surface layer member 20 that overlap the portions of the edge 16 of the base member 12 with no claws 18. This facilitates arrangement of the claws 18 and the engagement holes 26.

<Manufacturing Apparatus>

Figure 1:
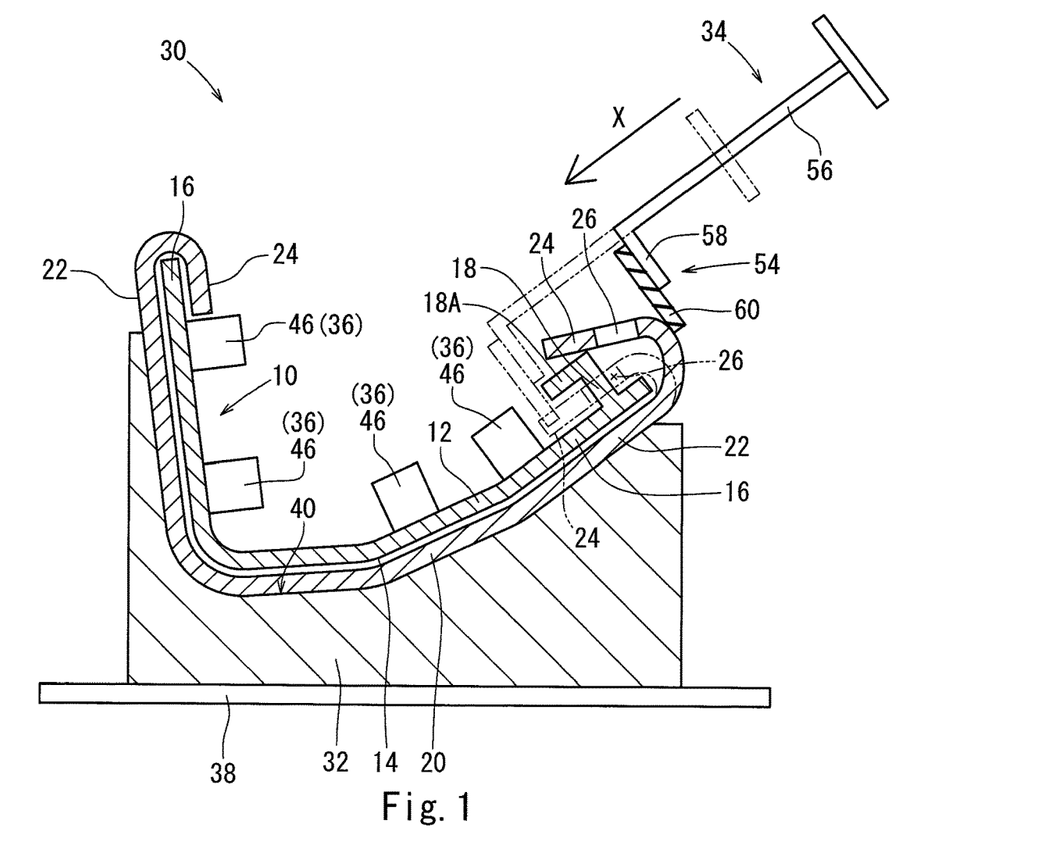
FIG. 1 is a schematic cross-sectional view of an apparatus for manufacturing a surface-layered part according to one embodiment.

The manufacturing apparatus 30 in one embodiment will now be described with reference to FIG. 1. FIG. 1 shows a general configuration of the basic elements of the manufacturing apparatus 30 in a schematic way. The manufacturing apparatus 30 includes a workpiece supporting table 32, a push-to-fit device 34, and a clamp device 36. The workpiece supporting table 32 is provided for placement of the workpieces, such as the armrest 10, to be produced. The clamp device 36 holds the workpieces, for example the armrest 10, against the workpiece supporting table 32. The push-to-fit device 34 operates to fit the wrapping portion 24 of the surface layer member 20 onto the base member 12, for instance the base member 12 of the armrest 10.

(Workpiece Supporting Table)

The workpiece supporting table 32 is mounted on a base 38 of the manufacturing apparatus 30. The supporting surface 40 of the workpiece supporting table 32 may be concaved, for instance for placement of an armrest 10 having a convex outer shape. The supporting surface 40 of the workpiece supporting table 32 may consist of a rigid member made of plastic. The base member 12, with the surface layer member 20 layered on the lower side, is placed on the supporting surface 40 of the workpiece supporting table 32. At this stage, the wrapping portion 24, shown on the right side in FIG. 1, is in an opened position that is disengaged from the edge 16 of the base member 12. Accordingly, the wrapping portion 24, shown on the right side in FIG. 1, is not yet fully fitted onto the edge 16 of the base member 12.

On the other hand, another wrapping portion 24, shown on the left side in FIG. 1, has already been fitted onto the corresponding edge 16 of the base member 12 when being placed on the workpiece supporting table 32. This fitting can be performed by a machine, such as a robot, when placing the base member 12 and the surface layer member 20 on the workpiece supporting table 32. Unlike the right one, the fitting of the left wrapping portion 24, which does not include a claw 18, onto the edge 16 of the wrapping portion 24 is easy when the right wrapping portion 24 is opened, and therefore may optionally be performed manually by hand.

(Clamp Device)

Figure 8:
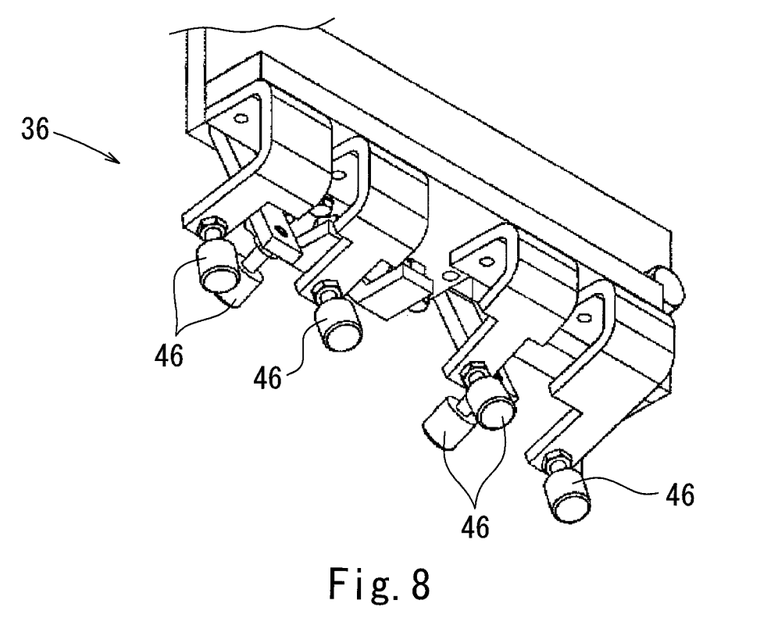
FIG. 8 is a perspective view of a specific configuration of clamp members of a clamp device.

FIG. 8 shows one exemplary configuration of the clamp device 36. When the base member 12 and the surface layer member 20 are placed on the supporting surface 40 of the workpiece supporting table 32, the clamp device 36 holds the base member 12 and the surface layer member 20 together against the supporting surface 40. To achieve this, the clamp device 36 includes a clamping portion 46 at a distal end of the operating mechanism. The clamp device 36 fixes the base member 12, from its back side, toward the supporting surface of the workpiece supporting table 32, as shown in FIG. 1. The clamp device 36 is a mechanism that is operated by a power cylinder (not shown).

(Push-to-Fit Device)

The push-to-fit device 34 of the depicted embodiment will now be described. As shown in FIG. 1, the push-to-fit device 34 is configured to fit the wrapping portion 24 of the surface layer member 20 onto the edge 16 of the base member 12. In the present embodiment, the push-to-fit device 34 is positioned so as to fit the wrapping portion 24 on the right side as seen in FIG. 1.

FIG. 1 schematically shows the push-to-fit device 34 by the movement of a pushing portion 54 alone. The push-to-fit device 34 includes, in part, a pushing portion 54 configured to push the wrapping portion 24 of the edge 22 of the surface layer member 20. The pushing portion 54 is moved by a movable member 56 in the direction of arrow X, from the position indicated by the solid lines to the position indicated by the two-dot-dashed lines. The direction of this movement is parallel to a surface of the edge 16 of the base member 12, to which the wrapping portion 24 in the edge 22 of the surface layer member 20 is to be fitted.

The pushing portion 54 includes a rigid base member 58. The pushing portion 54 also includes an elastic member 60 made of an elastic material. The elastic member 60 is formed on a surface of the base member 58 that faces forward in the pushing direction. The material of the elastic member 60 may be rubber, for example. The elastic member 60 extends downward beyond the lower end of the rigid base member 58. As a result, the lower end of the pushing portion 54 pushes the wrapping portion 24 only by pressing the elastic member 60 against the surface of the wrapping portion 24. This is done in a surface contact manner, that is, in a stroking manner.

The actuation of the movable member 56 of the push-to-fit device 34, for instance in the X direction, causes the pushing portion 54 to move the wrapping portion 24 of the surface layer member 20 from the position shown by the solid lines in FIG. 1 to the position shown by the two-dot chain lines. During this movement, the engagement holes 26 in the wrapping portion 24 are hooked by the claw 18, which is formed on the edge 16 of the base member 12. Due to this hooking, the wrapping portion 24 of the surface layer member 20 is fitted onto the edge 16 of the base member 12.

During the movement of the pushing portion 54 described above, the fitting of the wrapping portion 24 onto the edge 16 of the base member 12 is primarily effected by the rigid base member 58. Additionally, the elastic member 60, which extends downward from the rigid base member 58, moves in a stroking manner along the surface of the surface layer member 20. The stroking movement of the elastic member 60 ensures a more reliable fastening to the claw 18, at least in part due to the close contact with the surface of the surface layer member 20. Additionally, this allows for fitting without damaging the surface layer member 20.

Figure 5:
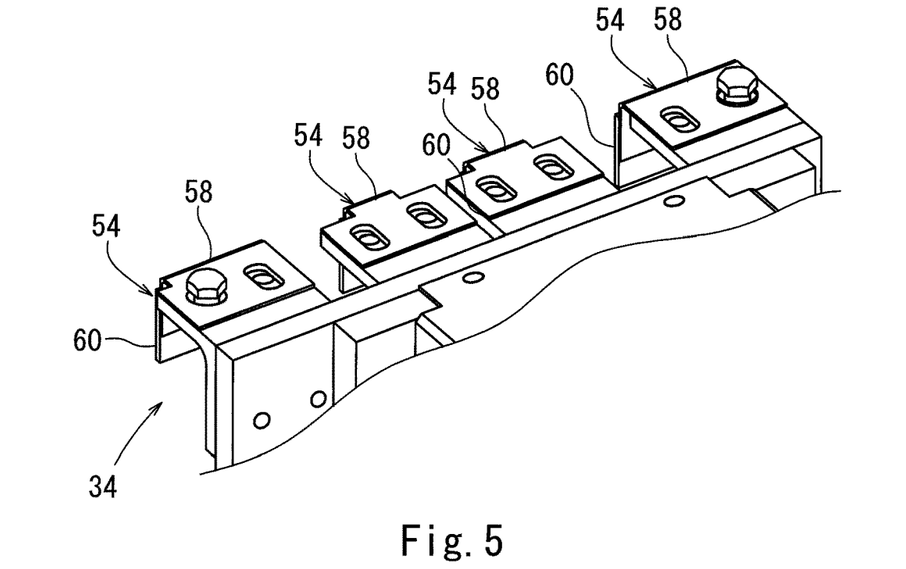
FIG. 5 is a perspective view of a pushing portion of a push-to-fit device, as viewed from the rearward side of the pushing direction.
Figure 6:
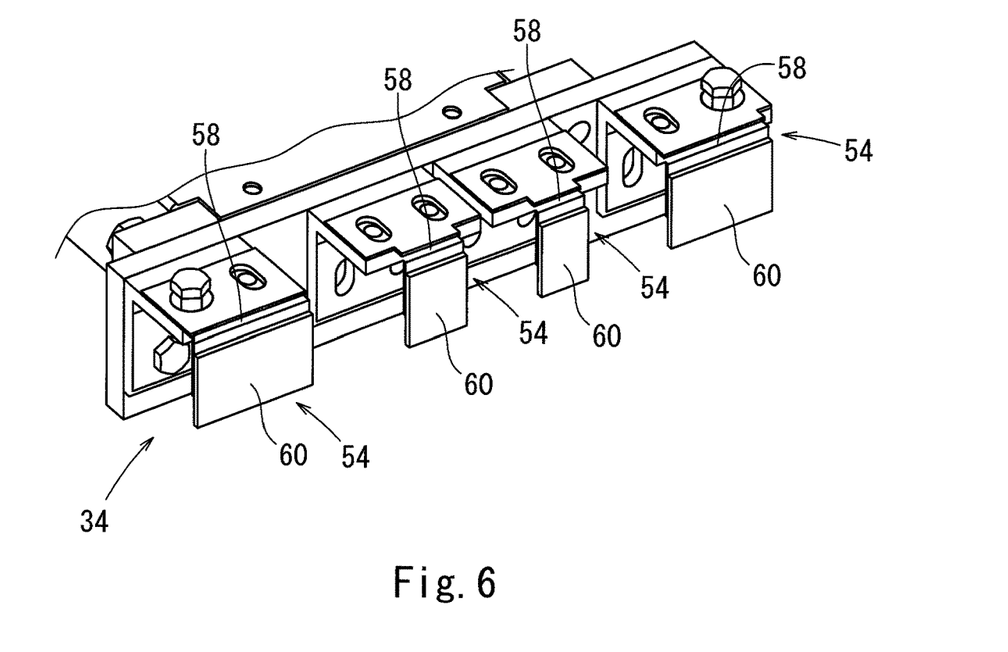
FIG. 6 is a perspective view of the pushing portion of the push-to-fit device, as viewed from the forward side of the pushing direction.

FIGS. 5 and 6 show an embodiment of a specific configuration of the push-to-fit device 34 around the pushing portions 54. FIG. 5 is a perspective view of the pushing portions 54 viewed from the rearward side of the pushing direction, while FIG. 6 is a perspective view of the pushing portions 54 viewed from the forward side in the pushing direction. The push-to-fit device 34 may be configured as a mechanism in which the shown pushing portions 54 are moved by two air cylinders (not shown).

Figure 7:
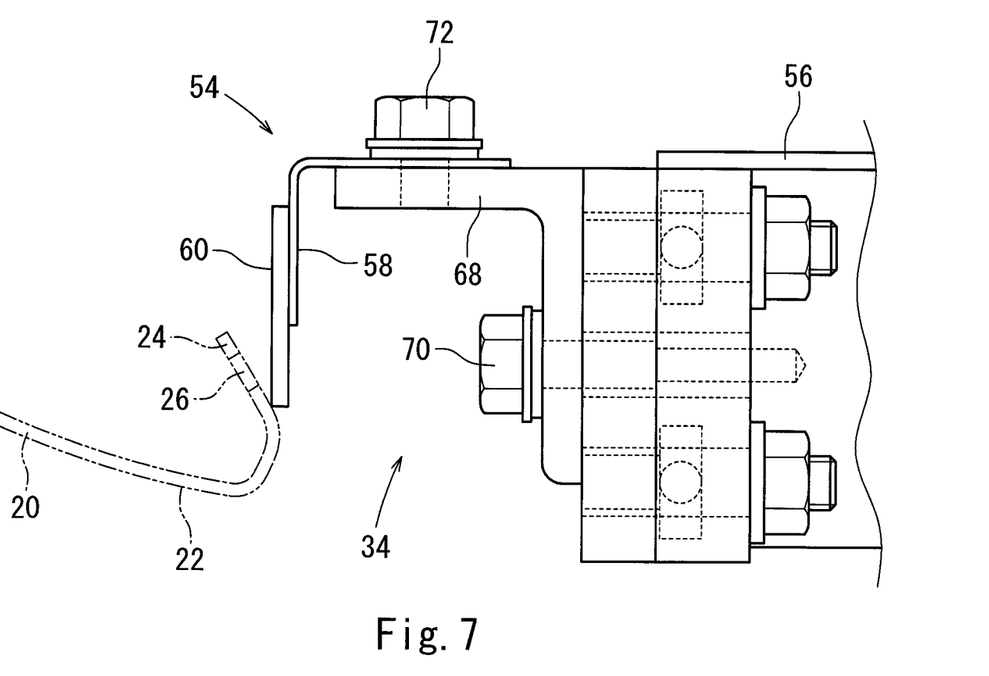
FIG. 7 is an enlarged view of a pushing portion of the push-to-fit device.

FIG. 7 shows an enlarged view of the pushing portion 54 of the push-to-fit device 34 shown in FIGS. 5 and 6. The pushing portion 54 is attached to a movable body via a connecting member 68. The movable body of this embodiment corresponds to the movable member 56 shown in FIG. 1. The connecting member 68 and the movable body are fixed to one another by one or more bolts 70. The connecting member 68 and the base member 58 of the pushing portion 54 are fixed to one another by one or more bolts 72. The pushing portion 54 may include an elastic member 60 made of an elastic material. The elastic member 60 may be formed on a surface of the base member 58 on its forward side, on a side in the direction of (a pushing) movement. The elastic member 60 extends downward beyond the lower end of the base member 58.

As shown by phantom lines (the two-dot dashed lines) in FIG. 7, when the pushing portion 54 pushes the wrapping portion 24 of the surface layer member 20, the base member 58 pushes the elastic member 60. Accordingly, the wrapping portion 24 is pushed by the elastic member 60, which extends downward from the base member 58, in a stroking manner. The wrapping portion 24 is pushed softly, and therefore is not easily scratched. In addition, little noise occurs due to the pushing, thereby reducing the whole working noise.

<Manufacturing Method>

One embodiment of a manufacturing method using the above described manufacturing apparatus 30 will now be described.

(Preparatory Step)

The base member 12 and the surface layer member 20 are prepared in advance in a specified shape. As described above referring to the manufacturing apparatus 30, the base member 12 is a rigid member, such as one made of polypropylene (PP). The surface layer member 20 is formed so as to have a property of being capable of expanding and contracting to some extent, for example by being formed of an olefin-based elastomer.

(First Step)

An example of the first step will now be described. As shown in FIG. 1, the base member 12 and the surface layer member 20, which were prepared in the specified shape in the preparatory step, are placed on the supporting surface 40 of the workpiece supporting table 32 of the manufacturing apparatus 30. They are arranged such that they are layered over each other. To place them on the supporting surface 40 in such a layered position, the surface layer member 20 may first be placed on the supporting surface 40, and the base member 12 may then be placed on top of the surface layer member 20. The surface layer member 20 and the base member 12 placed in such a layering manner on the workpiece supporting table 32 are then pressed by the clamping portions 46 of the clamp device 36. Accordingly, their position may be fixed.

After the first step, the wrapping portion 24, shown on the right side in FIG. 1, is in an opened position, such that it is away from the edge 16 of the base member 12. That is, the right wrapping portion 24 is not yet fitted on the edge 16 of the base member 12 when first placed on the workpiece supporting table 32.

However, in the present embodiment, the other wrapping portion 24, shown on the left side in FIG. 1, has already been fitted on the corresponding edge 16 of the base member 12 when placed on the workpiece supporting table 32, as described in the first step. This fitting may be performed by a machine, such as a robot, or manually by hand, as described above referring to the manufacturing apparatus 30.

(Second Step)

The second step will now be described. The second step includes fitting the wrapping portion 24, shown on the right side in FIG. 1, onto the base member 12 by the push-to-fit device 34. As this second step is explained with reference to FIG. 1, the push-to-fit device 34 will operate to fit the wrapping portion 24, shown on the right side in FIG. 1, onto the edge 16 of the base member 12, thereby assembling the surface layer member 20 with the base member 12.

The fitting operation of the wrapping portion 24 by the push-to-fit device 34 is effected by the pushing operation of the pushing portion 54. This pushing operation is performed, at least in part, by the elastic member 60, which extends beyond the lower ends of the base member 58 of the pushing portion 54, stroking the surface of the wrapping portion 24. This allows for a smooth fitting operation.

The wrapping portion 24, on the right side as seen in FIG. 1, is fastened by engagement of the claw 18 with the engagement hole 26. The engagement hole 26 of the wrapping portion 24 is hooked by the hooking tab 18A of the claw 18. This is done as the pushing portion 54 strokes the surface of the wrapping portion 24, as described above. This hooking prevents the wrapping portion 24 from being easily disengaged from the hooking tab 18A. For instance, this is realized because the hooking tab 18A extends to the left as seen in FIG. 1 while the wrapping portion 24 is biased to the right due to its own elasticity. Accordingly, the wrapping portion 24 is fastened to the base member 12 with little possibility of being detached from the base member 12.

In the present embodiment, the direction of movement of the pushing portion 54 of the push-to-fit device 34 is parallel to a surface of the edge 16 of the base member 12 onto which the wrapping portion 24 formed in the edge 22 of the surface layer member 20 is to be fitted. This allows the pushing operation of the wrapping portion 24 by the pushing portion 54 to be smoother.

<Subsequent Step>

The armrest 10, manufactured as an embodiment of the product produced through the above steps, is released from the clamping portion 46 of the clamp device 36 and taken out of the manufacturing device 30 by a robot, another machine, or manually by hand. The manufacturing process is thus completed.

Advantages of the Embodiments

The apparatus and method of manufacturing the armrest 10 of the embodiments described above enable mechanical fitting of a wrapping portion 24 of a surface layer member 20 onto an edge 16 of a base member 12. Productivity can thus be improved, as compared with manual fitting by hand. Additionally, when the product is mass produced, variations in quality can be stabilized.

In the case of the above configuration, when the wrapping portion 24 of the surface layer member 20 is fitted on the edge 16 of the base member 12, the claws 18 formed on the base member 12 are locked in the corresponding engagement holes 26 formed in the wrapping portion 24. Accordingly, the surface layer member 20 can be reliably assembled with the base member 12.

OTHER EMBODIMENTS

Further embodiments will be described below.

In the above embodiment, the surface-layered part has been described as an armrest of an automobile. In another embodiment, the above-mentioned manufacturing apparatus and method can be widely applied to any part with a structure in which a wrapping portion formed on a surface layer member is fitted to an edge of a base member when the surface layer member is attached to the base member. For example, the apparatus and method can be applied to an article of furniture (e.g. armrests of a chair) or an exterior part of a cosmetics box.

While the armrest 10 of the above embodiment is convex on the front side 14 of the base member 12, the surface-layered part may be convex on the opposite side, that is, it may be concave on the front side 14 of the base member 12. The surface-layered part, especially if it is not an armrest 10, may have an L-shaped cross-section.

In the above embodiment, the surface layer member 20 includes the engagement hole 26 in the wrapping portion 24, and the engagement hole 26 is hooked on the claw 18 formed on the edge 16 of the base member 12. However, the engagement hole 26 and the claw 18 may not be included, so that the wrapping portion 24 of the surface layer member 20 is simply fitted onto the edge 22 of the base member 12. The wrapping portion 24 shown on the left side in FIG. 1 may be mechanically fitted onto the edge 22 of the base member 12 by another push-to-fit device (not shown).

While the material for the base member 12 of the above embodiment has been described as polypropylene (PP), the base member 12 may be made of various thermoplastics other than PP, having a higher rigidity than the surface layer member 20, or a press-formed steel sheet.

The surface layer member 20 may be made of not only various thermoplastics such as soft polyvinyl chloride, styrene, olefin, and polyester, but may also be made of various other skin materials, including elastic woven and non-woven fabrics, knitted fabrics, synthetic leathers, natural leathers, and soft films.

While rubber was mentioned as an example of the material for the elastic member 60, an elastomer or a thin sheet of metal, such as stainless steel, may also be used.

<Advantages>

The above embodiments may have the following advantages.

In some embodiments, a base member, with a surface layer member layered on its lower side, may be placed on the workpiece supporting table. In this state, a wrapping portion formed at the edge of the surface layer member is in the opened position, where the wrapping portion is disengaged from the edge of the base member. A push-to-fit device then pushes the wrapping portion in the direction fitting it onto the edge of the base member. This automated mechanical fitting of the wrapping portion onto the edge of the base member improves the manufacturing productivity of the surface layered part. Furthermore, the quality of mass produced surface-layered parts is consistent.

In some embodiments, the push-to-fit device includes a pushing portion that pushes the wrapping portion. The pushing portion includes a rigid base member and a member made of elastic material on a surface of the rigid base member. The elastic member is positioned on the forward side of the rigid base member, in the pushing direction. The push-to-fit device fits the wrapping portion of the surface layer member onto the edge of the base member. This is done with the elastic member in contact with the wrapping portion, thereby preventing or suppressing the surface layer member from being damaged.

In some embodiments, the elastic member on a surface of the rigid base member on the forward side in the pushing direction extends beyond the lower end of the base member. As a result, the extended elastic member pushes the wrapping portion of the surface layer member in a stroking manner, so as to fit it onto the edge of the base member. This allows for a smooth fitting action.

In some embodiments, the direction of movement of the pushing portion of the push-to-fit device is parallel to a surface of the edge of the base member, the surface onto which the wrapping portion is fitted. This configuration allows for a more efficient operation of fitting the wrapping portion of the surface layer member onto the edge of the base member.

In some embodiments, the base member includes a claw (s) on its edge, and the surface layer member includes an engagement hole(s) in each wrapping portion that engages with a claw. The engagement of the claw(s) with the engagement hole(s) ensures reliable positioning of the surface layer member with respect to the base member.

While specific embodiments have been described above, it should be understood that the present invention is not limited to those embodiments, and various improvements, modifications, additions, and deletions can be made without departing from the spirit of the present invention.

What is claimed is:

1. An apparatus for manufacturing a surface-layered part, wherein the surface-layered part comprises a base member assembled with a surface layer member, wherein a front side of the base member is covered by the surface layer member, and a wrapping portion formed at an edge of the surface layer member is configured to be fitted onto an edge of the base member, the apparatus comprising:
   a workpiece supporting table on which the base member and the surface layer member are placed such that the surface layer member is layered with the base member; and
   a push-to-fit device configured to push the wrapping portion formed at the edge of the surface layer member in a direction to fit the wrapping portion onto the edge of the base member, the wrapping portion being pushed from an opened position in which the wrapping portion is away from the edge of the base member, wherein:
   the push-to-fit device comprises a pushing portion configured to push the wrapping portion formed at the edge of the surface layer member,
   the pushing portion comprises a rigid base member, and
   the pushing portion comprises an elastic member formed on a surface of the rigid base member.

2. The manufacturing apparatus according to claim 1, wherein:
   the surface of the rigid base member on which the elastic member is formed faces forward in the direction in which the wrapping portion is configured to be pushed.

3. The manufacturing apparatus according to claim 2, wherein the elastic member on the surface of the rigid base member extends beyond a lower end of the base member.

4. The manufacturing apparatus according to claim 2, wherein the pushing portion of the push-to-fit device moves parallel to a surface of the edge of the base member onto which the wrapping portion formed in the edge of the surface layer member is to be fit.

5. A method for manufacturing the surface-layered part using the manufacturing device according to claim 1, the method comprising:
   a first step of placing the base member and the surface layer member on the workpiece supporting table such that the surface layer member is layered under the base member, wherein the wrapping portion formed in the edge of the surface layer member is in the open position away from the edge of the base member; and
   a second step of operating the push-to-fit device to fit the wrapping portion formed in the edge of the surface layer member onto the edge of the base member to assemble the surface layer member with the base member.

6. The method according to claim 5, wherein:
   the base member includes a claw formed at the edge of the base member,
   the surface layer member includes an engagement hole at the wrapping portion formed at the edge of the surface layer member,
   the engagement hole is configured to be engageable with the claw, and
   the fitting of the wrapping portion of the surface layer member onto the edge of the base member is configured to cause the engagement hole to engage the claw.

7. The manufacturing apparatus according to claim 2, wherein the elastic member is configured to engage the wrapping portion formed in the edge of the surface layer member and to stretch the wrapping portion.

8. The manufacturing apparatus according to claim 2, wherein the elastic member is configured to stroke the wrapping portion formed in the edge of the surface layer member in the direction in which the wrapping portion is configured to be pushed.

9. The manufacturing apparatus according to claim 1, wherein a non-rigid portion of the push-to-fit device pushes the wrapping portion formed in the edge of the surface layer member.

10. The manufacturing apparatus according to claim 9, wherein the non-rigid portion of the push-to-fit device strokes the wrapping portion formed in the edge of the surface layer member as it pushes the wrapping portion.

* * * * *